United States Patent [19]

Dotzler et al.

[11] Patent Number: 4,679,760
[45] Date of Patent: Jul. 14, 1987

[54] SPRING ARRANGEMENT

[75] Inventors: Josef Dotzler, Amberg; Johann Meier, Fensterbach/Wolfring, both of Fed. Rep. of Germany

[73] Assignee: Grammer Sitzsysteme GmbH, Amberg, Fed. Rep. of Germany

[21] Appl. No.: 853,767

[22] Filed: Apr. 18, 1986

[30] Foreign Application Priority Data

May 14, 1985 [DE] Fed. Rep. of Germany ....... 3517345

[51] Int. Cl.⁴ ............................................. F16M 13/00
[52] U.S. Cl. .................... 248/602; 108/136; 248/424; 267/167; 297/344
[58] Field of Search ............... 248/602, 424, 429, 430; 267/150, 167, 179, 171, 131; 108/136; 297/337, 344

[56] References Cited

U.S. PATENT DOCUMENTS

| D. 88,662 | 12/1932 | McGowen | 297/344 X |
| 1,544,248 | 6/1925 | Liebl | 267/131 |
| 1,952,768 | 3/1934 | McGowen | 297/344 |
| 2,553,248 | 5/1951 | Graham | 267/150 |
| 2,694,612 | 11/1954 | Morrow | 108/136 |
| 3,948,555 | 4/1976 | Lesser et al. | 297/344 X |

FOREIGN PATENT DOCUMENTS

| 943171 | 5/1956 | Fed. Rep. of Germany . |
| 1380305 | 1/1964 | France . |
| 794275 | 1/1981 | U.S.S.R. ............................. 267/150 |

OTHER PUBLICATIONS

DE–Journal "Knostruktion" 21 (1969), issue 1, p. 35.
DE–Book "Die Federn", 1938, VDI–Verlag GmbH, Berlin NW 7, pp. 98/99.

Primary Examiner—Robert W. Gibson, Jr.
Assistant Examiner—David L. Talbott
Attorney, Agent, or Firm—Hoffmann, Dilworth, Barrese & Baron

[57] ABSTRACT

A springing arrangement comprises a coil spring and a spring-engaging member acting thereon between the two ends of the spring and in a direction which differs from the longitudinal direction of the spring, thereby to provide non-linear dependency of the spring force on the distance covered by the spring-engaging member. The spring-engaging member is made up of two elements on respective sides of the spring, each element bearing against the spring by way of a curved surface and extending over a plurality of turns of the coil spring.

5 Claims, 4 Drawing Figures

SPRING ARRANGEMENT

BACKGROUND OF THE INVENTION

Springing arrangements are known, comprising a resilient spring and a member which acts on the spring at one end thereof. The spring is compressed or stretched as a result of a force which acts on the member and thus in turn acts on the spring. The distance which is covered by the member under the effect of the force acting thereon is directly proportional to that force. That means that the distance covered by the member is linearly dependent on the force acting on the member, thus providing a linear spring characteristic or rate. There are however situations in which a non-linear spring characteristic would be desirable.

SUMMARY OF THE INVENTION

An object of the present invention is to provide a spring arrangement adapted to give a non-linear spring characteristic.

Another object of the present invention is to provide a springing arrangement which is of a simple and robust mechnaical construction while permitting fine adjustment of the spring characteristic in the springing action.

Yet another object of the present invention is to provide a springing arrangement for a vehicle seat, which provides in a simple fashion for ready adjustment of the springing characteristics of the seat.

In accordance with the principles of the present invention, these and other objects are attained by a spring arrangement comprising a resilient coil spring and a member engaging and adapted to act on the coil spring. The engaging member is arranged between the first and second stationary ends of the coil spring and, upon actuation of the arrangement, is adapted to act against the coil spring in a direction which deviates from the longitudinal direction thereof. The engaging menber comprises first and second elements which are disposed in mutually opposite relationship at substantially the same level on respective sides of the coil spring. Each element has a surface of a curved configuration, which is directed towards and bears against the coil spring, each such surface extending over a plurality of turns of the coil spring, while the two elements making up the engaging member are interconnected.

By virtue of the engaging member being disposed between the two ends of the spring which are connected for example to fixed or stationary support or connecting means, the arrangement provides a non-linear dependency of the spring force on the distance covered by the spring-engaging member, such that the spring force is relatively low in dependence on the distance covered by the engaging member, in a given central region around the neutral rest position of the arrangement, while increasing in an overproportional manner outside that central region. In that way the arrangement in accordance with the teaching of the present invention provides a spring characteristic having a soft middle range adjoined at each end thereof by ranges affording a hard spring action. As indicated, the surfaces of the elements making up the spring-engaging member, which bear against the respective sides of the coil spring over a plurality of turns thereof, are of a curved configuration, thereby making it possible as desired to influence the non-linear characteristic of the arrangement. The fact that the spring-engaging member is made up of two elements, disposed on respective sides of the spring, means that the spring is more securely held in position and can be acted upon by the spring-engaging member in opposite directions, from respective sides thereof. The curved surfaces of the two elements are usually of the same curvature but it should be appreciated that it is also possible for the two elements to be provided with srufaces which are of respectively different curved configurations. Such an arrangement gives a spring characteristic in one direction of movement of the spring-engaging member, which is different from the spring characteristic in the opposite direction of movement.

The two elements making up the spring-engaging member are preferably connected togehter in such a way that their respective curved surfaces both bear against the respective sides of the spring, that is to say, there is at least substantially no clearance between either of the elements and the respective adjoining turns of the spring, thus giving a play-free spring characteristic so that a given spring force is attributed to any deflection of the spring under the effect of the spring-engaging member acting thereon.

In addition to the possibility of adjusting the spring characteristic of the arrangement, by virtue of suitable selection of the curvature of the curved surfaces of the elements making up the spring-engaging member, it is also possible for the non-linear dependency of the spring force on the distance covered by the spring-engaging member to be adjusted by suitable selection in respect of the length and diameter of the coil spring, as well as the pitch of the turns thereof. Those parameters may thus be inter-related to provide any desired spring characteristic for the arrangement.

By virtue of the spring characteristic which can be obtained with the arrangement in accordance with the invention, comprising a soft spring action in a given range around a neutral rest position and a hard spring action outside the middle range, the arrangement according to the invention can be used to particular advantage to provide a horizontal springing action in regard to the seat surface of a seat portion of a vehicle seat, relative to a support means for the seat portion.

Further objects, features and advantages of the spring arrangement according to the present invention will be apparent from the following description of a preferred embodiment thereof, as illustrated in diagrammatic form in the drawings.

DESCRIPTION OF THE PREFERRED EMBODIMENT

Figure 1:
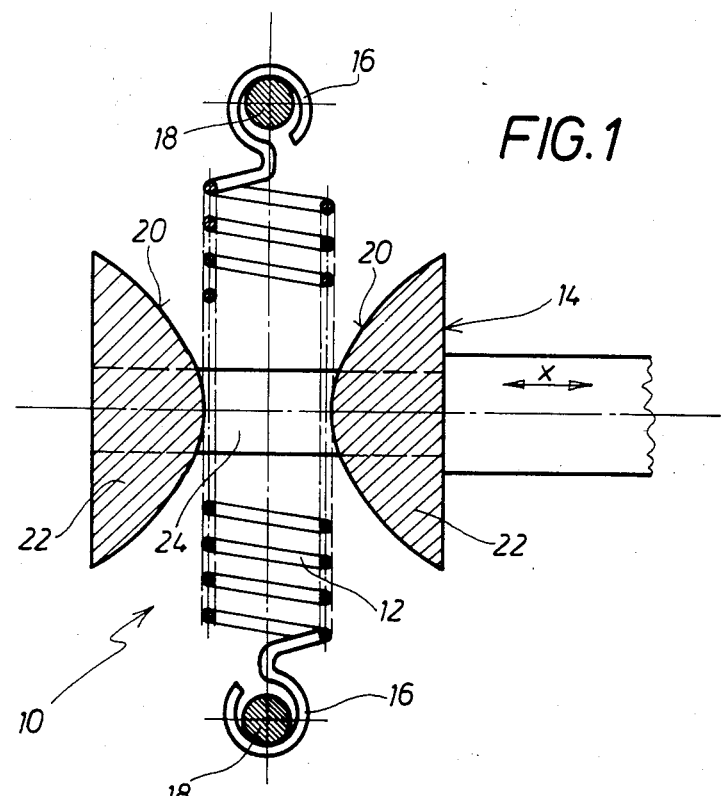
FIG. 1 is a side view of a spring arrangement according to the invention.
Figure 2:
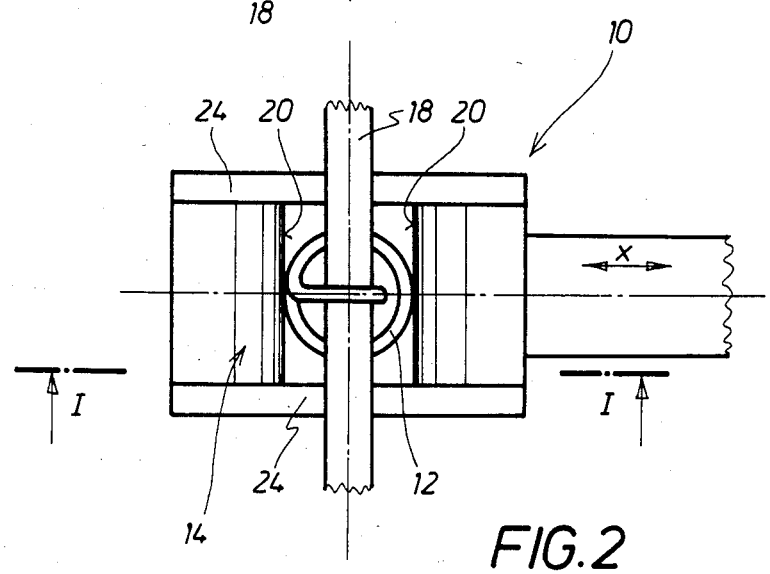
FIG. 2 is a view of the FIG. 1 construction seen from above.

Referring to FIGS. 1 and 2, shown therein is a spring arrangement as indicated generally at 10, comprising a resilient coil spring 12 and a spring-engaging member 14 which acts on the spring 12. The ends of the coil spring 12 are fixed to respective support or connecting means indicated diagrammatically at 18. The spring-engaging member 14 is arranged to act on the coil spring 12 between the two ends 16 thereof, in order to produce a non-linear dependency in respect of the spring force F on the distance x covered by the spring-engaging member 14 when it moves in a direction that deviates from the longitudinal direction of the coil spring 12. The movement of the spring-engaging member 14 is thus indicated by the double-headed arrow shown at the right-hand side in FIG. 1. Further reference to the structure of the FIG. 1 arrangement will be made hereinafter.

Figure 3:
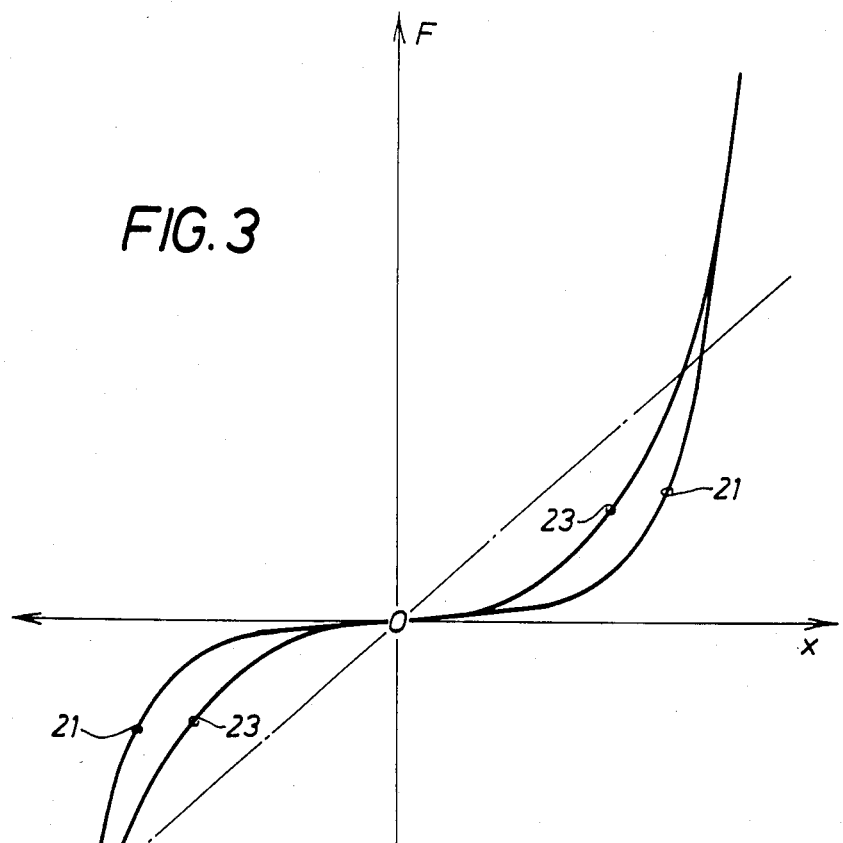
FIG. 3 shows the spring characteristic of different spring arrangements of the structure shown in FIGS. 1 and 2.

Reference will now be made to FIG. 3 showing two different spring characteristics of spring arrangements 10 constructed in accordance with the principles of the present invention. The spring characteristic identified by curve 21 is softer in a greater range around the neutral position of the spring arrangement 10, as indicated by reference 0, than the spring characteristic which is identified by curve 23. In FIG. 3, the dash-dotted line denotes the linear dependency of the spring force F on the distance x covered by a spring-engaging member in the longitudinal direction of the spring 12. In the spring arrangement 10 according to the invention, the spring-engaging member 14 acts against the spring 12 in a direction which differs from the longitudinal direction thereof, as indicated above and as can be clearly seen from FIG. 1. It will be seen therefore from FIG. 1 and also from FIG. 2 that the member 14 acts against the spring 12 in a direction which is at least substantially perpendicular to the longitudinal direction thereof, as indicated by the dash-dotted line passing through the centres of the connecting members 18. It is also possible for the member 14 to act against the spring 12 in a direction which is at an angle to the longitudinal direction of the spring 12, which is different from a right angle. By virtue of the member 14 acting on the spring 12 in an inclined direction in that fashion, it is possible further to influence the spring characteristic of the arrangement.

Referring still to FIGS. 1 and 2, it will be seen therefrom that the spring-engaging member 14 comprises two elements 22 which are disposed in mutually opposite relationship at substantially the same level on respective sides of the coil spring 12, so that the coil spring 12 is arranged between the two elements 22, substantially without clearance therebetween. Each of the elements 22 comprises a surface 20 which is of a curved configuration, being the surface that is towards and bears against the respective sides of the coil spring 12. The two mutually facing surfaces 20 of the elements 22 making up the spring-engaging member 14 are preferably of at least substantially the same configuration although it is also possible for the two surfaces 20 to be of different forms. By virtue of elements 22 of different configurations, the arrangement can provide a spring characteristic which is different in one direction of movement of the spring-engaging member 14, from that in the opposite direction of movement.

It will be clearly seen from FIG. 1 that each surface 20 extends over a plurality of turns of the coil spring so that, as the spring-engaging member 14 is displaced relative to the longitudinal or axial direction of the coil spring 12, an increasing number of turns of the coil spring will progressively come to bear against the respective surface 20, in other words, the spring is so-to-speak progressively wrapped around the curved surface 20 as the member 14 is increasingly displaced in relation to the axial line of the spring.

FIG. 2 shows that the two elements 22 making up the member 14 are connected together by side connecting members or plates 24 which thus pass around respective sides of the spring 12.

Figure 4:
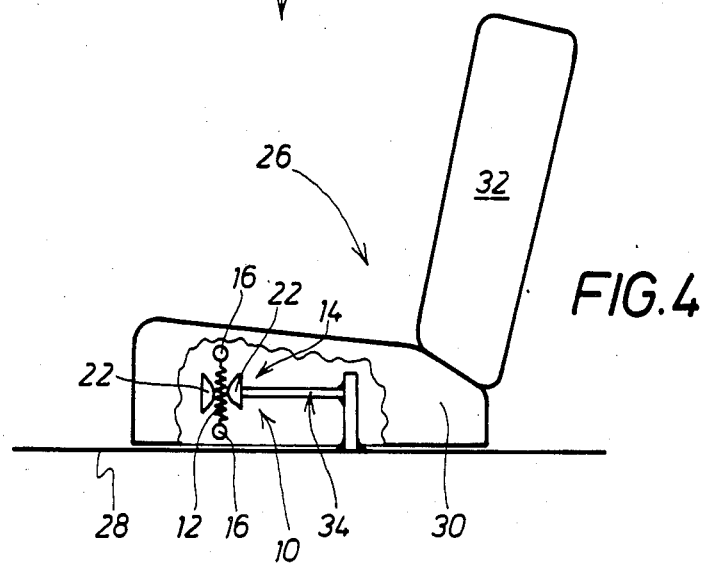
FIG. 4 is a diagrammatic side view partly in section of a vehicle seat including the spring arrangement shown in FIGS. 1 and 2.

Reference should now be made to FIG. 4 showing a situation of use of the spring arrangement in accordance with the present invention. FIG. 4 thus shows a partly sectional side view of a seat illustrated in the form of a vehicle seat 26 comprising a seat portion or squab 30 which is displaceable relative to a seat support means 28, and a backrest portion 32. Disposed in the seat portion 30 is the spring arrangement 10 according to the present invention, being shown in diagrammatic form in FIG. 4. The spring 12 is set in position vertically with its ends 16, in the seat portion 30. The spring-engaging member 14 which is arranged to engage the spring 12 between the two ends thereof, in order to provide a non-linear spring characteristic, has the two mutually oppositely disposed elements 22 with the spring 12 disposed therebetween. The spring-engaging member 14 is connected by way of a connecting element 34 to the support means 28 for the seat portion 30 of the vehicle seat 26.

In the case of a vehicle seat using a spring arrangement 10 as described hereinbefore, the structure provides horizontal springing of the seat portion, which has soft spring characteristics in a given range around the neutral rest position, which hard spring characteristics outside that range, in both directions, as shown in FIG. 3.

The above-described construction in accordance with the present invention was set forth solely by way of example thereof and further alterations and modifications may be made therein without thereby departing from the spirit and scope of the present invention.

We claim:

1. A spring arrangement comprising a resilient coil spring having first and second ends fixed relative to each other, and a spring-engaging member adapted to act on the spring between said first and second ends of the spring in an actuating direction which differs from the longitudinal direction of the spring, said engaging member comprising first and second interconnected elements which are disposed in mutually opposite relationship at substantially the same level on respective sides of said spring, each said element having a surface of a curved configuration which is adapted to bear against said spring and which extends over a plurality of turns of said coil spring, thereby to provide non-linear dependency of the spring force on the relative distance covered as between said engaging member and said spring.

2. A spring arrangement as set forth in claim 1 wherein said actuating direction is at least substantially normal to said longitudinal direction.

3. A spring arrangement comprising a first spring mounting means, a second spring mounting means disposed at a spacing from said first spring mounting means, said first and second spring mounting means fixed relative to each other, a spring having a first end adapted to be connected to said first spring mounting means and a second end adapted to be connected to said second spring mounting means, means for engaging said spring at a location intermediate said first and second ends thereof and adapted to act against said spring in a direction which differs from the longitudinal direction of the spring, said spring-engaging means comprising first and second elements which are disposed in interconnected relationship on respective sides of said spring and in at least substantially directly mutually opposite relationship and which each have a curved surface adapted to bear against said spring at said respective sides thereof over a substantial portion of the length thereof, the engagement of said spring-engaging means with said spring providing a non-linear dependency of the spring force of said spring on the relative travel as between said spring-engaging means and said spring upon actuation of the arrangement in said direction which differs from the longitudinal direction of said spring.

4. A spring arrangement as set forth in claim 3 wherein said first and second members on respective sides of said spring are interconnected by connecting members which pass around the sides of said spring.

5. In a vehicle seat comprising a support means and a portion, a spring arrangement as set forth in claim 3 for horizontal springing of said seat portion of the vehicle seat relative to said support means.

* * * * *

UNITED STATES PATENT AND TRADEMARK OFFICE
CERTIFICATE OF CORRECTION

PATENT NO. : 4,679,760

DATED : Jul. 14, 1987

INVENTOR(S) : Dotzler, et al

It is certified that error appears in the above-identified patent and that said Letters Patent is hereby corrected as shown below:

At Column 1, line 24 "mechnaical" should read --mechanical--

At Column 1, line 38 "menber" should read --member--

At Column 2, line 14 "togehter" should read --together--

At Column 4, line 28 "which" should read --with--

Signed and Sealed this

Fifth Day of April, 1988

Attest:

DONALD J. QUIGG

*Attesting Officer*    *Commissioner of Patents and Trademarks*